United States Patent
Beardsley et al.

(10) Patent No.: US 6,535,937 B1
(45) Date of Patent: Mar. 18, 2003

(54) WRITE COMMAND VERIFICATION ACROSS A PCI BUS SYSTEM

(75) Inventors: Brent Cameron Beardsley, Tucson, AZ (US); Michael Thomas Benhase, Tucson, AZ (US); Russell Lee Ellison, Corona de Tucson, AZ (US); Gregg Steven Lucas, Tucson, AZ (US); Juan Antonio Yanes, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/503,911

(22) Filed: Feb. 15, 2000

(51) Int. Cl.$^7$ ............................................... G06F 13/38
(52) U.S. Cl. ..................................................... 710/100
(58) Field of Search ........................ 710/100, 104–106, 710/126

(56) References Cited

U.S. PATENT DOCUMENTS

| | | | |
|---|---|---|---|
| 5,428,745 A | * 6/1995 | de Bruijn et al. ............ 395/100 |
| 5,838,932 A | 11/1998 | Alzien ........................ 395/308 |
| 5,870,567 A | 2/1999 | Hausauer et al. ........... 395/281 |
| 5,911,051 A | 6/1999 | Carson et al. ............... 395/287 |
| 5,918,028 A | 6/1999 | Silverthorn et al. ........ 395/309 |
| 5,928,346 A | 7/1999 | Johnson et al. ............. 710/126 |

\* cited by examiner

Primary Examiner—Thomas M. Heckler
(74) Attorney, Agent, or Firm—John H. Holcombe

(57) ABSTRACT

A method and system to verify the passage of one or more write commands sent from an originating location through a PCI bus system. An addressable data storage is located substantially at the end of the PCI bus system with respect to the originating location. A write command is sent by the originator subsequent to the one or more write commands, to a predetermined special end location address identifying the addressable storage. The command is accompanied by data comprising a predetermined special return address at the originating location. The PCI bus system transmits the write commands on a FIFO basis, so the one or more write commands precede the subsequently sent write command. Logic senses the subsequently sent write command, and responds to the command, sending a return echo write command to the predetermined special return address. The returning echo write command verifies the passage of the write commands and data through the PCI bus system. The predetermined special end location address is the key to identify the subsequently sent write command.

21 Claims, 5 Drawing Sheets

WRITE COMMAND VERIFICATION ACROSS A PCI BUS SYSTEM

DOCUMENTS INCORPORATED BY REFERENCE

Commonly assigned U.S. patent application Ser. No. 09/275,610, filed Mar. 24, 1999, is incorporated for its showing of a PCI bus bridge system for processing requests from multiple attached agents.

FIELD OF THE INVENTION

This invention relates to the verification of write commands in a PCI bus system, and, more particularly, to such verification in a complex PCI bus system having at least two PCI busses.

BACKGROUND OF THE INVENTION

The Peripheral Component Interconnect (PCI) bus system is a high-performance expansion bus architecture which offers a low latency path employing PCI bridges through which a host processor may directly access PCI devices. In a multiple host environment, a PCI bus system may include such functions as data buffering and PCI central functions such as arbitration over usage of the bus system.

The incorporated '610 application describes an example of a complex PCI bus system for providing a connection path between a secondary PCI bus, to which are attached a plurality of hosts, and at least one primary PCI bus, to which is attached a peripheral device server. The incorporated '610 application additionally defines many of the terms employed herein, and such definitions are also available from publications provided by the PCI Special Interest Group, and will not be repeated here.

Computer system data storage systems may employ PCI bus systems to provide fast data storage from hosts, such as network servers, via channel adapters and the PCI bus system, to attached data storage servers having storage devices, cache storage, or non-volatile cache storage. It is advantageous to provide data storage that operates at relatively fast speeds which approach or match the speeds of the host processors, or release the host processors, such that the host processors are not slowed.

The data to be stored is typically customer data which will be retrieved at a subsequent time. It is of the utmost importance to the customer that the customer data not be lost or compromised. Thus, in addition to fast data storage, there must be some assurance that customer data that has been transmitted across the PCI bus system, has not been lost. Hence, most channel adapters for the hosts require an acknowledgment that their data transfer write operations have completed successfully.

In PCI bus systems, the channel adapters perform PCI write commands to transfer data to their destinations. Channel adapters generally poll (a PCI read command) a hardware indicator that signals "End of Transfer", or issue a PCI read command to a location as far down the data path as possible in an attempt to acquire an acknowledgment that the data transfer had completed successfully.

Complex PCI bus systems, such as that of the incorporated '610 application, employ arbitration between commands from the attached channel adapters on the PCI bus system to manage the usage of the bus system in an efficient manner. One element of PCI architecture is that PCI read commands are not allowed to supersede or pass PCI write commands. Therefore, once the PCI read command has returned the data which has been read back to its originator, it is safe to assume that the prior PCI write command(s) were completed. Thus, upon receiving the read data, the channel adapter has the desired acknowledgment.

Read operations are slow and inefficient because, after initiation of a read, a substantial wait is required while the data is accessed and loaded for passage back through the bus system. Therefore, the architecture blocks the requester from the PCI bus until after the data is loaded, so as to allow other uses of the bus by other requesters. An element of arbitration is that the adapter sending a read command must receive the response within a predetermined time, or will have to give up the interface as the arbitrator cycles to the next agent having work. As the result, the originator continues to request the read results which are ultimately provided to a buffer to match the request. Therefore, PCI read commands are extremely slow operations to complete, especially in complex PCI bus systems with multiple hosts and with multiple PCI bridges between the channel adapters and the storage system. During the time required to complete the read, the host adapter that originated the original writes which are being verified must pause and wait for the read command to be completed before receiving an acknowledgment that the write operation completed successfully, effectively locking up the host adapter.

SUMMARY OF THE INVENTION

It is an object of the present invention to provide a method and system for asynchronously and promptly verifying the passage of at least one write command and data sent at an initiating PCI bus through the PCI bus system to a location substantially at the end of the PCI bus system, allowing the originator to do additional work in the interim.

In a PCI bus system having at least one PCI bus, a method and system are provided for verifying the passage of one or more write commands and their accompanying data sent at the PCI bus through the PCI bus system from an originating location coupled to the PCI bus to a location towards an end of said PCI bus system. The PCI bus system is implemented to transmit write commands on a FIFO basis. The passage verifying system comprises an addressable location substantially at the end of the PCI bus system with respect to the PCI bus. In one embodiment, the addressable location comprises storage for receiving and storing data accompanying a write command. A write command is sent subsequent to the one or more write commands at the initiating PCI bus, the subsequently sent write command addressed to a predetermined special end location address identifying the addressable location, the subsequently sent command accompanied by data comprising a predetermined special return address of the originating location. The FIFO PCI bus system causes the one or more write commands to precede the subsequently sent write command. Logic coupled to the addressable storage senses the subsequently received write command, and responds thereto, sending a return echo write command to the predetermined special return address. Thus, the return echo write command verifies the passage of the one or more write commands and data through the PCI bus system from the originating location to the location substantially at the end of the PCI bus system.

In one embodiment, the logic employs the predetermined special end location address as a key to identify the subsequently sent write command and to send the return echo write command.

In a further embodiment, the logic additionally sends the predetermined special return address as data accompanying the return echo write command. Thus, the predetermined special return address confirms to the originator the passage of the write commands and data through the PCI bus system.

As the subsequently sent write command is processed asynchronously, the originating agent is freed to conduct additional work.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
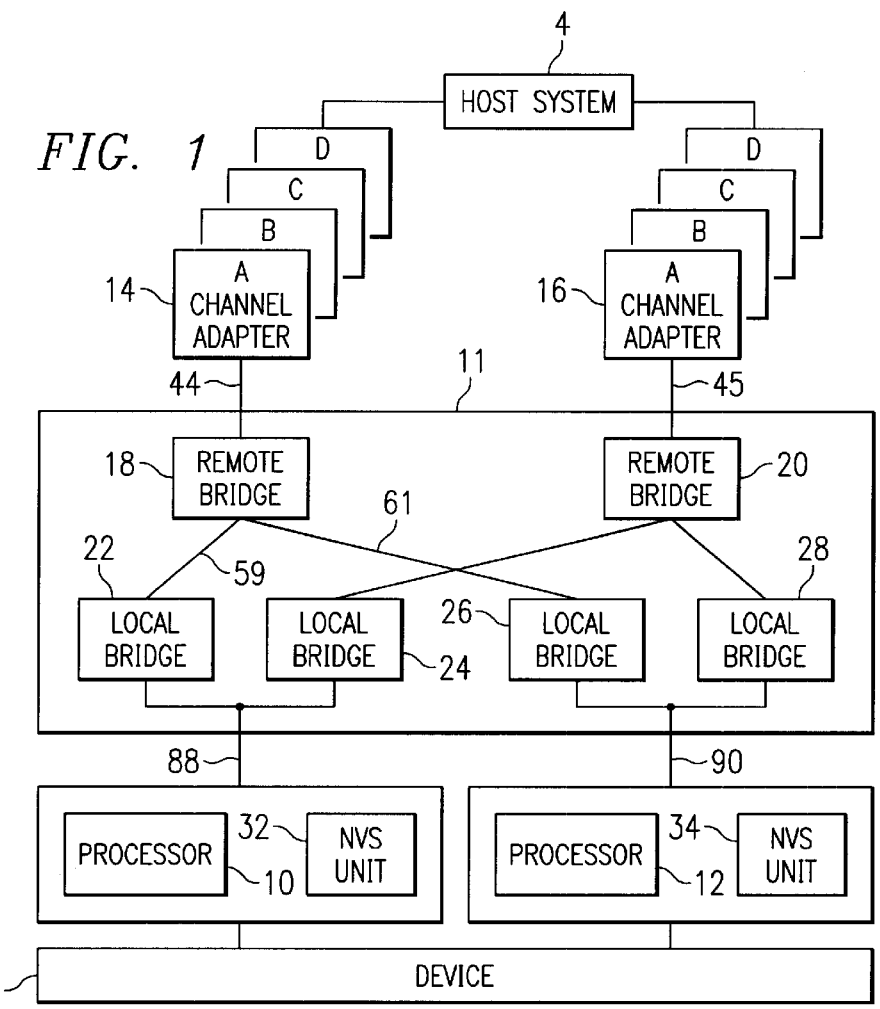
FIG. 1 is a block diagram of a PCI bus system in accordance with an embodiment of the present invention and attached host systems and devices.

Referring to FIG. 1, a PCI bus system 11 is illustrated in accordance with an embodiment of the present invention which provides communication paths, for example, between one or more host systems 4 and devices such as processors 10, 12, and NVS (non-volatile store) units 32, 34, all associated with a device 6. The exemplary PCI bus system 11 is based upon that illustrated in the incorporated '610 application, employing similar components, modified in accordance with the present invention. As discussed in the incorporated '610 application, the device 6 may comprise an direct access storage device (DASD) subsystem, such as a string of DASDS.

The PCI bus system 11 allows the host systems 4 to communicate with the processor 10 and processor 12, employing adapters 14A, B, C and D, 16A, B, C and D or other communication agents (not shown), including any device that typically communicates over a PCI bus. The channel adapters 14, 16 may comprise channel adapter cards that are each connected via a slot on the PCI bus system to a remote bridge 18, 20 of the PCI bus system 11. Each channel adapter card provides a connection to one or more host systems 4 at a secondary PCI bus 44, 45. Briefly, processor 10 controls a primary PCI bus 88, and processor 12 controls a primary PCI bus 90, each providing addresses for access by the adapters 14, 16 at secondary PCI busses 44, 45.

Two remote bridges 18, 20 may be provided coupled to different sets of channel adapters or other communication agents, and each remote bridge is coupled to local bridges. Thus, remote bridge 18 is coupled to local bridges 22, 26, and remote bridge 20 is coupled to local bridges 24, 28. In the instant example, the local bridges 22–24 may communicate with processor 10 and NVS unit 32 on primary PCI bus 88, although other arrangements may be envisioned by those of skill in the art. Thus, in the present example of a PCI bus system, either the adapters 14A–D or the adapters 16A–D or agents coupled to remote bridge 18, 20 may communicate with the processor 10 or NVS unit 32 over the PCI bus system 11.

An important communication in a PCI bus system employed for data storage is the writing of data by a host system 4 in redundant fashion, e.g., at the NVS unit 32, 34 and at a device 6 under the control of the processor 10, 12 at opposite local bridges. Host systems typically deal with and process large amounts of data and require prompt access to, or storage of, that data to allow the host systems to continue processing without substantial wait times. Therefore, low latency of the bus system is required for such prompt access or storage. The Peripheral Component Interconnect (PCI) bus system is a high-performance expansion bus architecture which offers such a low latency path employing PCI bridges through which a host processor may directly access PCI devices.

In a multiple host environment, a PCI bus system may include such functions as data buffering and PCI central functions such as arbitration over usage of the bus system. As the result, the PCI bus systems become increasingly complex. The incorporated '610 application describes an example of a complex PCI bus system for providing a connection path between a secondary PCI bus 44, to which is attached at least one host system 4, and at least one primary PCI bus 88, to which are attached one or more computer system data storage controllers, such as processor 10. The computer system data storage controllers employ the PCI bus system to provide fast data storage for the hosts.

The data to be stored is typically customer data which will be retrieved at a subsequent time. It is of the utmost importance to the customer that the customer data not be lost or compromised. Thus, in addition to fast data storage, there must be some assurance that customer data that has been transmitted across the PCI bus system, has not been lost. Hence, most channel adapters for the hosts require an acknowledgment or verification that their data transfer write operations have completed successfully.

In PCI bus systems, the channel adapters 14 perform PCI write commands to transfer data to their destinations. Subsequently, the channel adapters have polled (a PCI read command) the target device attached to the PCI bus for a hardware indicator that signals End of Transfer, or the channel adapters have issued a PCI read command to a location as far down the data path as possible in an attempt to acquire an acknowledgment that the data transfer had completed successfully.

An example of a write operation is the redundant writing of host data to the data storage device 6 along one path, and to an NVS unit along another path. First, the data is written to one of the NVS units, e.g., NVS unit 32, at one data path. Should power go down, the data is held at the NVS unit 32 and may be recovered. Then, the data is written to the cache memory of a processor at the other data path to the device 6, e.g., processor 12. The processor 12 may then store the data at device 6. In prior storage systems, the channel adapter 14 is stalled after writing to the NVS while waiting receipt of the verification, and only after receiving the verification will the channel adapter write to the processor 12.

Figure 2:
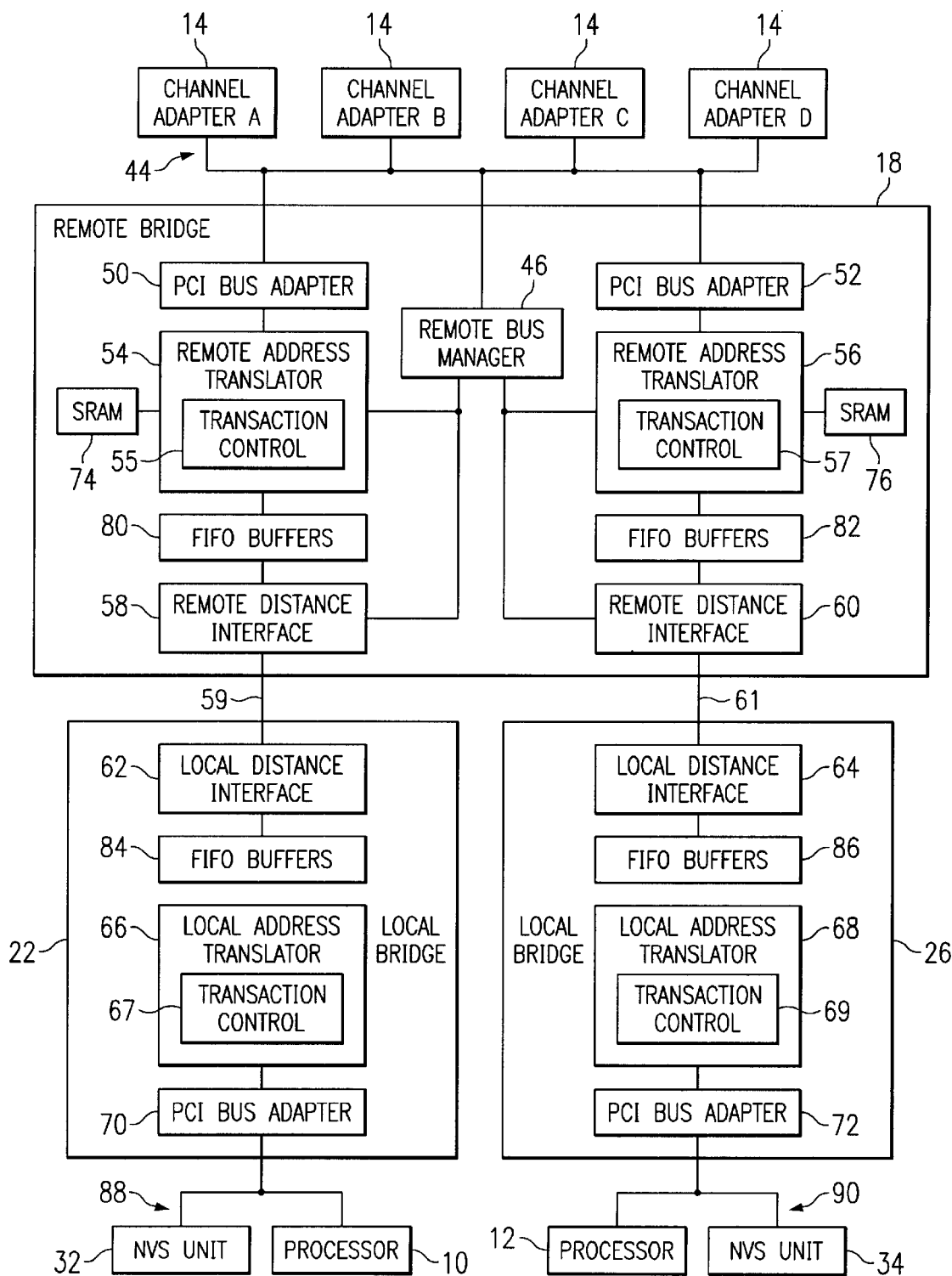
FIG. 2 is a block diagram of the PCI bus system of FIG. 1, illustrating a PCI remote bridge and two PCI local bridges with PCI bus adapters.

Referring additionally to FIG. 2, further detail of one-half of the exemplary complex PCI bridge system of FIG. 1 is illustrated. As discussed in the incorporated '610 application, complex PCI systems employ arbitration between commands from the attached channel adapters on the secondary PCI bus to manage the usage of the bus system in an efficient manner. In the example of FIG. 2, the arbitration is conducted by a bus manager 46 of the remote bridge 18. Typically, a PCI bus manager 46 selects the commands from the channel adapters 14A–D on secondary PCI bus 44 in a round-robin fashion. As discussed above, an element of the PCI bus architecture is that PCI bus systems conduct read operations at significantly lower efficiency than write commands from hosts (channel adapters) attached to the bus. Therefore, PCI read commands are extremely slow operations to complete, especially in complex PCI bus systems with multiple hosts and with multiple PCI bridges between the channel adapters and the storage devices. As the result, the channel adapters that originated the write requests to store data are awaiting verification by means of a read command, and must pause and wait for the read command to be completed before receiving an acknowledgment that the write operation completed successfully.

The exemplary PCI bus system of FIG. 2 includes the PCI bus manager 46 which manages data and signals presented on the secondary PCI bus 44. The PCI bus manager 46 comprises bus central resource functions, which include circuitry that manages the bus arbitration discussed above, bus parking, and other bus management functions, preferably with standalone circuitry. The bus manager 46 has information describing the address ranges of remote PCI bus adapters 50 and 52 and uses this information to determine which remote PCI bus adapter is targeted by a PCI operation. The information on the address ranges is preferably written to registers in the PCI bus adapters 50 and 52 which may be accessed by the bus manager 46. The remote bridge 18 also comprises remote address translators 54, 56, transaction controls 55, 57, remote distance interfaces 58, 60, and static random access memories (SRAM) 74, 76, or any other suitable memory devices. The PCI bus adapter 50, remote address translator 54, transaction control 55, and remote distance interface 58 provide communication between channel adapters 14 and local bridge 22. The PCI bus adapter 52, remote address translator 56, transaction control 57, and remote distance interface 60 provide communication between channel adapters 14 and local bridge 26. The channel adapters 14A, B, C, D communicate with either PCI bus adapter 50 or 52 via the PCI bus 44. The PCI bus adapters 50, 52 may comprise PCI bridges as are known in the art or any other suitable type of bridge circuitry. The remote 58, 60 and local 62, 64 distance interfaces include controls and buffers known in the art to control transactions between the remote bridge 18 and the local bridges 22, 26 and provide for long distance communication therebetween over long distance connections 59, 61. The remote bridge 20 in FIG. 1, may be the same or similar to the remote bridge 18, and provides communication with the local bridges 24 and 28 which may be the same or similar to the local bridges 22, 26.

Each local bridge 22, 26 comprises, respectively, a local distance interface 62, 64, a local address translator 66, 68, a transaction control 67, 69, and a PCI bus adapter 70, 72. The remote 54, 56 and local 66, 68 address translators include circuitry known in the art to map a received address to another address space. Remote address translators 54, 56 perform address translation operations by mapping an address provided by channel adapters 14 to the address space of the local PCI bus adapters 70, 72, respectively, and to the address spaces of the elements of the bridge 18, and of the attached NVS units 32, 34 and processors 10, 12. Local address translators 66, 68 map an address from the local PCI bus adapters 70, 72 to the remote PCI bus adapter 50, 52 address space, and to the address spaces of the elements of the local bridge 22, 26, and of the channel adapters 14, such that this translated address is transmitted to the remote address translator 54, 56 via the local 62, 64 and remote 58, 60 distance interfaces. In such case, the remote address translator 54, 56 may buffer and transmit this received address to the remote PCI bus adapters 50, 52. Similarly, after remote address translator 54, 56 translates an address received from the remote PCI bus adapter 50, 52 to the address space of the local PCI bus adapter 70, 72, respectively, this translated address is transmitted to the local address translator 66, 68 via the remote 58, 60 and local 62, 64 distance interfaces. In such case, the local address translator 66, 68 may buffer and transmit this received address to the local PCI bus adapter 70, 72.

The FIFO buffer sections 80, 82, 84, and 86 queue the read/write transactions in the PCI bus system 11. Each of the FIFO buffer sections comprises multiple FIFO buffers to queue the transaction from the channel adapters 14A, B, C, D and the processor 10. The address translators 54, 56, 66, and 68 include transaction control circuitry 55, 57, 67, and 69 that comprises logic to select queues in the FIFO buffers 80, 82, 84, and 86 to place a transaction and manage the flow of transactions. The FIFO buffers insure that the write commands, and other transactions, are kept in sequence as they progress through the PCI bus system 11.

The PCI busses 44 and 88 are designed for only very short distances, measured substantially in inches, and small loads, and the distance connections 59, 61 are designed for longer distances with greater loads.

Figure 3:
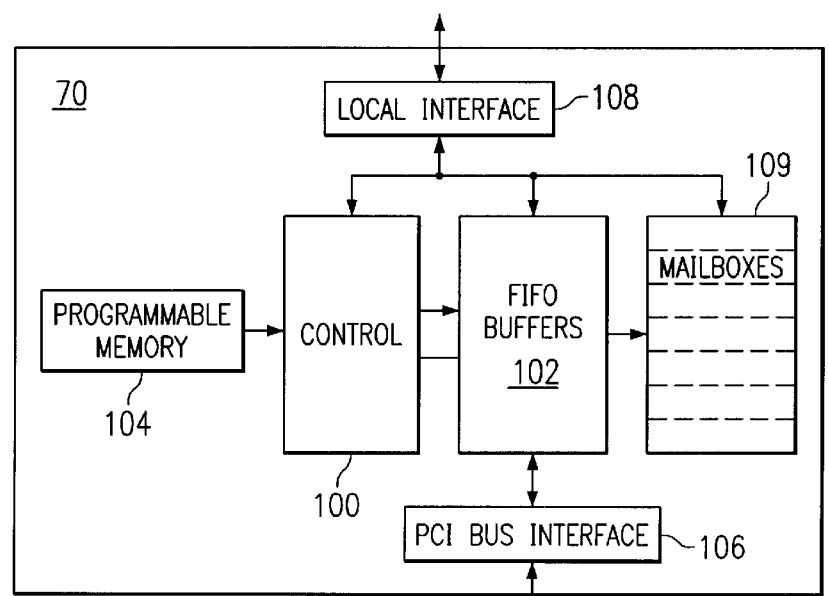
FIG. 3 is a block diagram of a PCI bus adapter of FIG. 2.

FIG. 3 illustrates an example of a PCI bus adapter 70, which is preferably the same as PCI bus adapter 72, and may be the same as, or similar to, PCI bus adapters 50 and 52. The PCI bus adapters may, for example, comprise the commercially available PCI 9060 PCI Bus Master Interface chip provided by PLX Technology, Inc., 390 Potrero Avenue, Sunnyvale, Calif. 94086.

The PCI bus adapter 70, 72 comprises control logic 100 which is configured with a programmable memory 104, such as a serial EEPROM, a PCI bus interface 106 to PCI bus 88, and a local interface 108 to the local address translator 66, 68 and transaction control 67, 69 of FIG. 2. The PCI bus adapter provides two independent bi-directional DMA (direct memory access) channels, and has several FIFOs 102 for providing two bi-directional FIFOs for the DMA channels, and the adapter comprises two bi-directional channels for direct bus master transfers and slave access. Each DMA channel supports burst transfers and direct bus master transfers. Additionally, the PCI bus adapter is provided with a series of mailbox registers 109, for storing information that may be employed by the PCI bus adapter.

Figure 4:
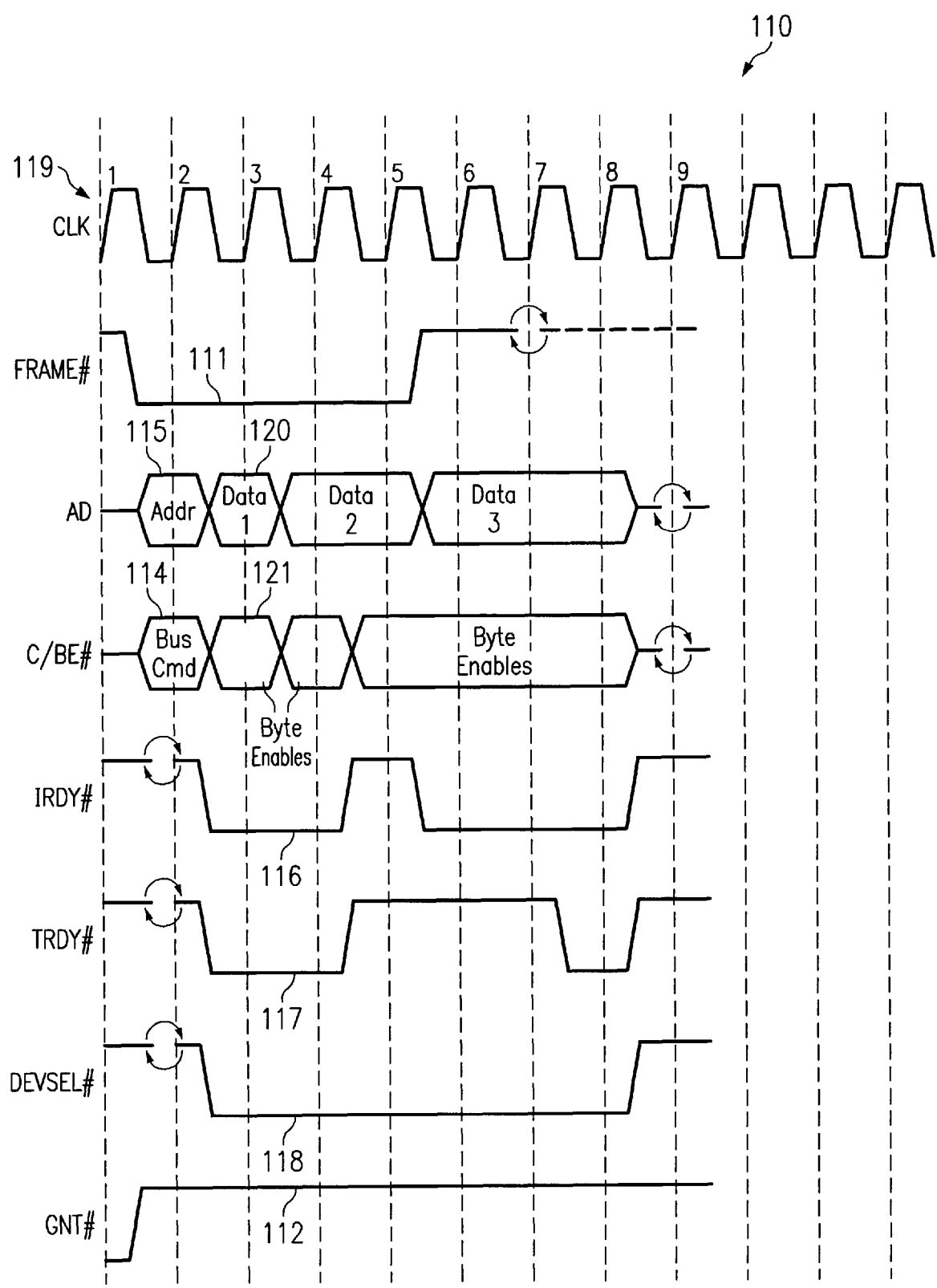
FIG. 4 is a diagrammatic representation of an exemplary PCI bus write command and accompanying data and signals of a PCI bus which may implement the write commands of the PCI bus system and method of the present invention.

An exemplary PCI bus write command 110 and accompanying data and signals of a PCI bus are illustrated in FIG. 4. A cycle frame signal 111 is negatively driven by the initiator of the command and indicates the start and duration of a transaction. The transaction will be from an initiator that has been granted ownership of the bus by a bus manager, e.g., bus manager 46 in FIG. 2, by asserting a negative grant signal 112. The write command is provided as, e.g., 4 bits 114, on a command/byte enable bus, and the address is provided as, e.g., 32 bits 115, on an address/data bus, both of the PCI bus. An initiator ready signal 116 is driven by the current bus master (the initiator of the transaction). During a write, the initiator ready signal 116 is asserted to indicate that the initiator is driving valid data onto the data bus. Target ready 117 is driven by the currently addressed target. It is asserted when the target is ready to accept data from the master and complete the current data phase (data transfer). Device select 118 is asserted by a target when the target has decoded its address. It acts as an input to the current initiator and the decoder in the address translator. In order to determine that bus ownership has been acquired, the master must sample the frame signal 111 and initiator ready signal 116 on the same rising edge of a PCI clock signal 119. The data 120 is then driven onto the PCI bus by the initiator with byte enable signals 121.

The complexity of a PCI bus system is thus required to insure that the commands are properly sequenced through the system. As discussed above, the data to be stored is typically customer data which will be retrieved at a subsequent time, and it is of the utmost importance to the customer that the customer data has been transmitted across the PCI bus system and has not been lost. Hence, most channel adapters for the hosts require an acknowledgment or verification that their data transfer write operations have completed successfully. The prior use of PCI read commands in an attempt to acquire an acknowledgment that the data transfer had completed successfully, results in lengthy wait times, and no additional operations can be initiated for the originating adapters while the responses are in progress.

Hence, in accordance with the present invention, a method and system are provided for asynchronously verifying the passage of one or more write commands and their accompanying data sent at the secondary PCI bus, e.g., bus 44, through the PCI bus system, e.g., PCI bus system 11, from an originating location coupled to the secondary PCI bus, e.g., adapters 14, to a target location.

Referring to FIGS. 1–4, the passage verifying system comprises an addressable path to a location substantially at the end of the PCI bus system with respect to the PCI originator. In the instant example, the PCI bus adapter 70, 72 is substantially at the end of the PCI bus system with respect to the originating channel adapter 14 at the PCI bus 44. A write command 110 is sent subsequent to the one or more write commands at the initiating PCI bus, the subsequently sent write command sent to a predetermined special end location address of the path, such as an addressable storage. As an example, the predetermined special location is predetermined as the address of one of the mailboxes 109 of the PCI bus adapter 70, 72.

The present invention identifies the subsequently sent write command by its special end location address. The address is not required to be an actual register, but rather is required to be an address of a location that is used for no other purpose than the identification of the subsequently sent write command. Thus, the one of the mailboxes 109 selected as the predetermined special location has no other use in the PCI bus system.

Figure 5:
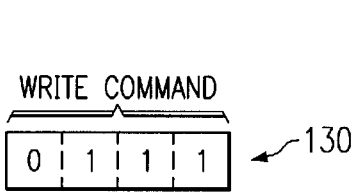
FIG. 5 is a bit chart representation of a PCI bus "memory write" command type employed by the present invention.
Figure 6:
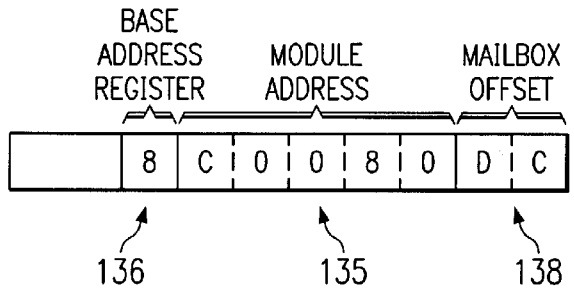
FIG. 6 is a byte chart representation of an embodiment of a PCI bus address implementing an embodiment of a predetermined special end location address identifying the addressable storage in accordance with the PCI bus system and method of the present invention.

The bit pattern of a PCI bus write command 130 is illustrated in FIG. 5, and the address of one of the mailboxes 109 is illustrated in FIG. 6. In PCI systems, the addresses comprise address phases 115 on the address/data bus of FIG. 4, which is typically 32 bits. Thus, the exact devices are addressed in several phases. As shown in FIG. 6, the PCI bus adapter module is addressed by the module address 135 and the base address register (BAR) 136. The specific predetermined mailbox is addressed by the mailbox offset 138.

Figure 7:
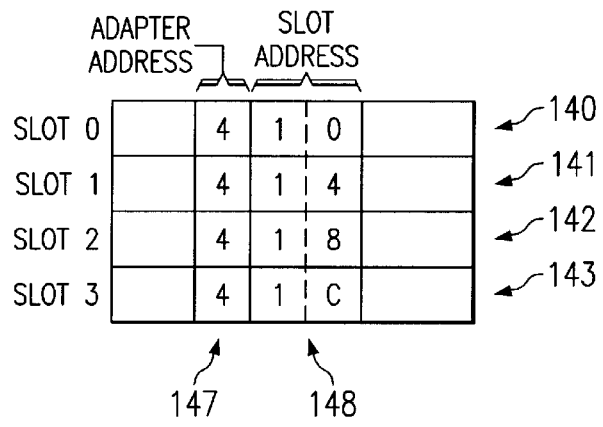
FIG. 7 is byte chart representations of an embodiment of PCI bus addresses of returning echo write command predetermined special return addresses in accordance with the PCI bus system and method of the present invention.

The subsequently sent command is accompanied by data 120 comprising a predetermined special return address, which may comprise an address of the originating location. Examples of predetermined special return addresses are illustrated in FIG. 7. Each of the slots comprises a register in an adapter. In one embodiment, each slot 140-143 represents a different one of the adapters, and in another embodiment, each slot represents a different sequence of commands from the same adapter. Thus, the adapters 14 are identified in column 147, and the slot addresses are in column 148, the selected slot address comprising the predetermined special return address. Accordingly, a host may send separate sequences of commands through one adapter or through several adapters, each sent through different PCI bridges, and track the sequences with the different slot registers.

The special return address location is preferably, but not necessarily, at the originating adapter. One of the adapters may be charged with insuring that the writes are error-free before presenting "clean" ending status to the host.

Referring to FIGS. 1–7, the FIFO PCI bus system 11 causes the one or more write commands to precede the subsequently sent write command. The PCI bus adapter control 100 of the local bridge 22, 26 receiving the subsequently sent write command, receives and stores the data 120 (special return address 140-143) accompanying the write command in the addressable storage 109.

In accordance with the present invention, the local address translator 66, 68 transaction control 67, 69 of the local bridge receiving the subsequently sent write command senses the subsequently sent write command, in one embodiment employing the predetermined special end location address (predetermined one of the mailboxes 109) as a key to identify the command as the subsequently sent command. As an example, the mailbox location address comprises a key address 138 which is detected when the operation is processed by the transaction control 67, 69, and enables the logic to build the returning echo write command. In one embodiment, the transaction control then "snoops" the data accompanying the subsequently sent write command from the address/data bus and employs the data as the returning echo write address and data. "Snooping" is the sensing of signals without acknowledgment. In an alternative embodiment, the transaction control accesses the data accompanying the subsequently sent write command (special return address) from the mailbox 109 as the return echo write address and data.

In a further alternative embodiment, the control 100 of the PCI adapter bus 70, 72 both senses the subsequently sent write command by detecting the mailbox location address of the write command, and stores the data in the mailbox.

Thus, the predetermined special location address is the key to sensing the write command as a subsequently sent write command.

The transaction control 67, 69, or control 100, responds to the sensing of the subsequently sent write command, by sending a return echo write command to the predetermined special return address 140-143, which was supplied as data accompanying the subsequently sent write command. Again, the bit pattern of a PCI bus write command 130 is illustrated in FIG. 5. The write command is in the format of the other write commands, so that the command appears to the address translators 66, 68, 54, 56, as though it originated at the processor 10.

Thus, the return echo write command is forwarded through the PCI bus system at high efficiency to the addressed adapter slot. Receipt of the return echo write command verifies the passage of the one or more write commands and data through the PCI bus system from the originating location to the location substantially at the end of the PCI bus system (PCI bus adapter 70, 72).

Additionally, the return echo write command is accompanied by data which comprises the predetermined special return address, either snooped from the local bus, or read from the mailbox 109. Thus, the data further verifies and confirms the passage of the at least one write command and data through the PCI bus system.

In the short time that the return echo write command is processed, the preceding write command data will have been stored in the NVS unit 32 and allowed the channel adapter to do more work, such as sending the write command to the processor 12.

In accordance with the present invention, the subsequently sent write command is sensed by the transaction control 67, 69 of the local bridge 22, 26 whose PCI bus adapter mailbox is addressed by the command. The transaction control is substantially at the end of the PCI bus system with repsect to the PCI originator, such as a channel adapter 14.

Figure 8:
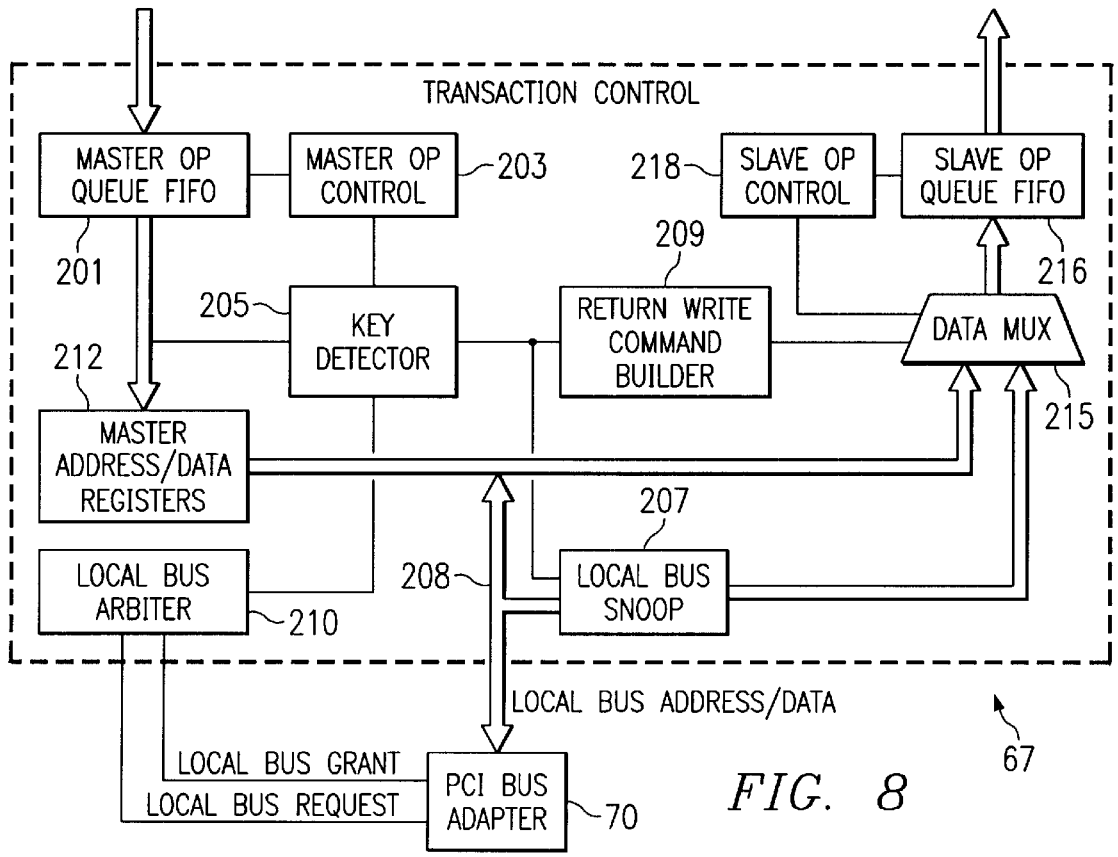
FIG. 8 is a block diagram of an embodiment of a transaction control of FIG. 2 arranged in accordance with the present invention.

An example of a transaction control 67 in accordance with the present invention is illustrated in FIG. 8. A master OP queue FIFO 201 receives commands from the local address translator 66 of FIG. 2. A master OP control 203 reads and processes the next command from the master OP queue FIFO 201. The command includes the address of the element to which the command is directed, and the master OP control 203 and a key detector 205 sense the subsequently sent write command based upon the predetermined special end location address. Upon sensing the subsequent write command, local bus snoop logic 207 and return write command builder logic 209 are enabled.

Additionally, a local bus arbiter 210 is blocked from processing operations, called "slave OPs" from the PCI bus adapter 70. The subsequent write command is processed through master address/data registers 212 to the local bus 208 and PCI bus adapter 70. The PCI bus adapter 70 may respond to the command and write the mailbox.

In one embodiment of the present invention, the data accompanying the subsequent write command is "snooped" by the local bus snoop 207 at local bus 208. The local bus snoop 207 "snoops" by reading information on the local bus 208 without putting any information on the bus. The snooped data is the predetermined special return address, and the return write command builder 209 operates data multiplexor 215 to gate the special return address into a slave OP queue FIFO 216, as the address for the return echo write command. The return write command builder 209 then again gates the snooped local bus data special return address into the slave OP queue FIFO 216 as the data for the return echo write command. From there, the return echo write command is treated the same as any slave operation from the PCI bus adapter, and is processed normally by slave OP control logic 218.

The transaction control 67, 69, and/or the PCI bus adapter 70, 72 may be considered an addressable path, and the mailbox 109 may be considered an addressable location.

Figure 9:
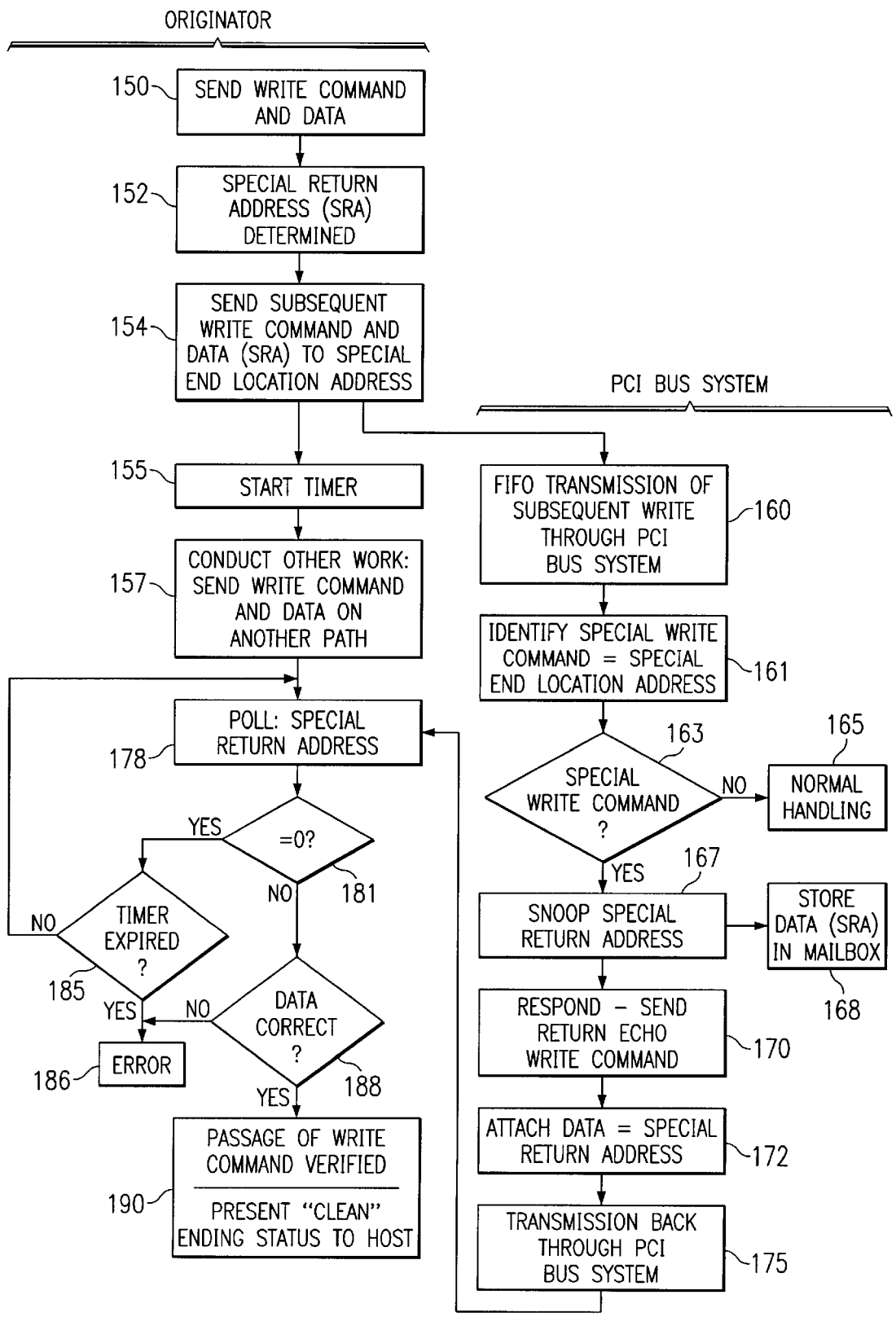
FIG. 9 is a flow chart depicting an embodiment of the method of the present invention.

An embodiment of the method of the present invention is illustrated in FIG. 9. Referring additionally to FIGS. 1–8, the originator sends the write command in step 150, e.g., via an adapter 14A, B, C, D, through the PCI bus system 11 to a destination, such as an NVS unit 32. In step 152, the originator adapter determines the special return address. As discussed above, the predetermined special return address comprises a register slot 140-143 in the adapter.

The originator adapter coupled to the PCI bus system, in step 154, sends the subsequent write command onto the PCI bus 44, accompanied by data, the data comprising the predetermined special return address of the originating location 140-143. The write command addresses the special end location address, e.g., mailbox 109. Additionally, the originator adapter may start a timer in step 155 which is sufficiently long that expiration of the timer in step 185, without verification of passage of the write commands, is an error, as will be discussed. In accordance with the present invention, the channel adapter, in step 157, is freed to conduct other work, such as sending a write command to processor 12.

The FIFO PCI bus system 11 causes the prior write commands and data to progress through the PCI bus system before the subsequently sent write command, and is shown as step 160.

In step 161, the transaction control 67, 69, or the control 100 receives, and senses the special write command and identifies the command by the special end location address. In step 163, if the command is not the special write command, "NO", it is handled in a normal manner for the command in step 165. If the command is the special write command, the local bus snoop logic 207 is enabled, and the data, the special return address, accompanying the write command is stored in the addressed mailbox 109 by the transaction control 67, in step 168.

Then, having sensed the special write command and enabled the local bus snoop 207, the transaction control or PCI bus adapter control, in step 170, builds the return echo write command for return to the predetermined special return address. The data attached to the return echo write command is the same predetermined special return address, in step 172. In order to accomplish the return echo write command, the actual address may have to be translated by the address translators 66, 68, 54, 56, and the predetermined special return address will have taken the translation into account. Thus, the return address of the data of step 172 may appear upon return receipt, different from the actual address of the predetermined special return address of the originating location 140-143.

The return echo write command and accompanying data are then transmitted back through the PCI bus system 11, as represented by step 175.

In step 178, the originating adapter polls the predetermined special return addressed location 140-143 of the originating adapter to which the command is addressed for receipt. Step 181 determines whether the location 140-143 is empty, and, if so, step 185 determines whether the timer started in step 155 by the originating adapter has expired. If the timer had expired, "YES", an error is indicated in step 186. If the timer has not expired, step 178 is repeated at a subsequent time. If step 181 indicates that data has been written into the polled location, the adapter, in step 188, determines whether the data is correct. Specifically, the data is the address of the location in which the data has been written. Incorrect data is an error, resulting in step 186. If the data is correct, the originating adapter verifies passage of the write commands preceding the subsequently sent write command through the PCI bus system 11, to the location substantially at the end of the PCI bus system, in step 190. The originating adapter then signals "clean" status to the host system 4.

While the subsequently sent write command is being processed in accordance with the present invention, the originating adapter is freed to conduct other operations.

The present invention is also applicable for write commands originating at one of the processors 10, 12 of FIGS. 1 and 2, and directed to the NVS 32, 34 at the other branch of the PCI bus system 11. The special return address would be at the originating processor, and the subsequent write command would be sent to the special end location of the local bridge 22-28 associated with the target processor.

Thus, the present invention provides a method and system for promptly and asynchronously verifying the passage of at least one write command and data sent at an initiating PCI bus through the PCI bus system to a location substantially at the end of the PCI bus system.

While the preferred embodiments of the present invention have been illustrated in detail, it should be apparent that modifications and adaptations to those embodiments may occur to one skilled in the art without departing from the scope of the present invention as set forth in the following claims.

We claim:

1. In a PCI bus system having at least one PCI bus, a method for verifying the passage of at least one write command and data sent at said PCI bus through said PCI bus system from an originating location coupled to said PCI bus, to a location substantially at the end of said PCI bus system with respect to said originating location, said PCI bus system transmitting write commands on a FIFO basis, comprising the steps of:

subsequent to sending said at least one write command and data at said initiating PCI bus, sending, at said initiating PCI bus, a write command and data to a predetermined special end location address, said predetermined special end location address identifying said PCI bus system end location, said subsequently sent write command data comprising a predetermined special return address, said FIFO PCI bus system causing said at least one write command to precede said subsequently sent write command;

receiving said subsequently sent write command and data addressed to said predetermined special end location address identifying said PCI bus system end location; and sensing said receipt and responding thereto, sending a return echo write command to said predetermined special return address, whereby said return echo write command verifies said passage of said at least one write command and data through said PCI bus system from said originating location to said location substantially at the end of said PCI bus system.

2. The method of claim 1, wherein said step of sensing said receipt and responding thereto additionally comprises identifying said predetermined special end location address as a key to send said return echo write command.

3. The method of claim 2, wherein said step of sensing said receipt and responding thereto additionally comprises snooping said subsequently sent write command data as said predetermined special return address.

4. The method of claim 1, wherein said step of sensing said receipt and responding thereto additionally comprises sending said return echo write command in the format with which said at least one write command and data was sent, such that said return echo write command appears as though it were sent at one of said PCI busses through said PCI bus system.

5. The method of claim 1, wherein said PCI bus system end location comprises a PCI bus adapter mailbox identified by said predetermined special end location address, and wherein said step of receiving said subsequently sent write command and data at said PCI bus system end location additionally comprises receiving said subsequently sent write command at said PCI bus adapter and storing said data at said mailbox.

6. The method of claim 5, wherein said step of sensing said receipt and responding thereto additionally comprises responding to said sensed subsequently sent write command, snooping said subsequently sent write command data as said predetermined special return address.

7. The method of claim 1, wherein said step of responding to said receipt additionally comprises sending data accompanying said return echo write command to said predetermined special return address, said data comprising said predetermined special return address, whereby said data accompanying said return echo write command further verifies said passage of said at least one write command and data through said PCI bus system.

8. In a PCI bus system having at least one PCI bus, a system for verifying the passage of at least one write command and data sent at said PCI bus through said PCI bus system from an originating location coupled to said PCI bus, said PCI bus system transmitting write commands on a FIFO basis, said passage verifying system comprising:

an addressable path for receiving write command, said addressable path having an addressable location substantially at the end of said PCI bus system with respect to said originating location; and logic coupled to said addressable path, said logic sensing a write command sent subsequent to said at least one write command at said initiating PCI bus, said subsequently sent write command addressed to a predetermined special end location address identifying said addressable location, said subsequently sent write command accompanied by data comprising a predetermined special return address, said FIFO PCI bus system causing said at least one write command and data to precede said subsequently sent write command; said logic responding to said sensed received subsequently sent write command and data, sending a return echo write command to said predetermined special return address, whereby said return echo write command verifies said passage of said at least one write command and data through said PCI bus system from said originating addressable location to said location substantially at the end of said PCI bus system.

9. The passage verifying system of claim 8, wherein said logic identifies said predetermined special end location address as a key to send said return echo write command.

10. The passage verifying system of claim 9, wherein said logic additionally comprises bus snoop logic which snoops said data accompanying said subsequently sent write command to identify said predetermined special return address.

11. The passage verifying system of claim 8, wherein said logic sends said return echo write command in the format with which said at least one write command and data was sent, such that said return echo write command appears as though it were sent at one of said PCI busses through said PCI bus system.

12. The passage verifying system of claim 8, wherein said addressable path additionally comprises a PCI bus adapter having a mailbox, said PCI bus adapter mailbox comprising said addressable location, and wherein said PCI bus adapter additionally receives said subsequently sent write command and stores said data at said mailbox.

13. The passage verifying system of claim 12, wherein said logic additionally comprises bus snoop logic which snoops said subsequently sent write command data as said predetermined special return address.

14. The passage verifying system of claim 8, wherein said logic additionally sends data accompanying said return echo write command to said predetermined special return address, said data comprising said predetermined special return address, whereby said data accompanying said return echo write command further verifies said passage of said at least one write command and data through said PCI bus system.

15. A PCI bus system for verifying the passage of at least one write command and data sent through said PCI bus system from an originating location coupled to said PCI bus system, comprising:

a PCI bus coupled to said originating location;

a bus manager coupled to said PCI bus, transmitting said write commands from said PCI bus on a FIFO basis through said PCI bus system to a target location;

an addressable path for receiving a write command, said addressable path having an addressable location substantially at the end of said PCI bus system with respect to said originating location; and logic coupled to said addressable path, said logic sensing a write command sent subsequent to said at least one write command at said initiating PCI bus, said subsequently sent write command addressed to a predetermined special end location address identifying said addressable location, said subsequently sent write command accompanied by data comprising a predetermined special return address, said FIFO PCI bus system causing said at least one write command and data to precede said subsequently sent write command; said logic responding to said received subsequently sent write command, sending a return echo write command to said predetermined special return address, whereby said return echo write command verifies said passage of said at least one write command and data through said PCI bus system from said originating location to said addressable location substantially at the end of said PCI bus system.

16. The PCI bus system of claim 15, wherein said logic identifies said predetermined special end location address as a key to send said return echo write command.

17. The PCI bus system of claim 16, wherein said logic additionally comprises bus snoop logic which snoops said data accompanying said subsequently sent write command to identify said predetermined special return address.

18. The PCI bus system of claim 15, wherein said logic sends said return echo write command in the format with which said at least one write command and data was sent, such that said return echo write command appears as though it were sent at a PCI bus through said PCI bus system.

19. The PCI bus system of claim 15, wherein said addressable path additionally comprises a PCI bus adapter having a mailbox, said PCI bus adapter mailbox comprising said addressable location, and wherein said PCI bus adapter additionally receives said subsequently sent write command and stores said data at said mailbox.

20. The PCI bus system of claim 19, wherein said logic additionally comprises bus snoop logic which snoops said subsequently sent write command data as said predetermined special return address.

21. The PCI bus system of claim 15, wherein said logic additionally sends data accompanying said return echo write command to said predetermined special return address, said data comprising said predetermined special return address, whereby said data accompanying said return echo write command further verifies said passage of said at least one write command and data through said PCI bus system.

* * * * *